United States Patent [19]

Rohrberg et al.

[11] 4,205,944
[45] Jun. 3, 1980

[54] ELECTRONIC CONTROL CIRCUIT FOR BLOWERS IN VEHICLES

[75] Inventors: Klaus Rohrberg, Stuttgart; Werner Fehr, Ludwigsburg, both of Fed. Rep. of Germany

[73] Assignee: Süddeutsche Kühlerfabrick Julius Fr. Behr, Fed. Rep. of Germany

[21] Appl. No.: 897,598

[22] Filed: Apr. 19, 1978

Related U.S. Application Data

[63] Continuation-in-part of Ser. No. 498,025, Aug. 16, 1974, abandoned.

[30] Foreign Application Priority Data

Aug. 16, 1973 [DE] Fed. Rep. of Germany ....... 2341296

[51] Int. Cl.$^2$ .................... F04B 49/06; B60H 3/04; F01P 5/12
[52] U.S. Cl. .................... 417/32; 123/41.02; 123/41.44; 165/42
[58] Field of Search .............. 123/41.02, 41.44; 165/42; 62/184; 417/32; 318/434, 471, 472, 473

[56] References Cited

U.S. PATENT DOCUMENTS

| 2,991,405 | 7/1961 | Carlson | 318/471 |
| 3,439,622 | 4/1969 | Welty | 417/45 |
| 3,478,532 | 11/1969 | Cootey et al. | 417/44 |
| 3,555,356 | 1/1971 | Kaiser | 318/473 |
| 3,613,391 | 10/1971 | Hawter | 62/184 |
| 3,633,376 | 1/1972 | Miner | 62/184 |
| 3,697,781 | 10/1972 | MacMillan | 318/678 |
| 3,735,602 | 5/1973 | Ramsey | 62/184 |
| 3,812,409 | 5/1974 | Diwger | 318/317 |
| 3,868,554 | 2/1975 | Konrad | 318/472 |

*Primary Examiner*—William L. Freeh
*Attorney, Agent, or Firm*—Browdy and Neimark

[57] ABSTRACT

A device for controlling blower motors for air conditioning units especially for those installed in vehicles. For eliminating changes in air flow due to changing dynamic pressure at the blower air inlet; the blower is controlled by maintaining blower motor current constant according to an adjustable set point and according to the dynamic pressure a pressure detector at the blower inlet the set point is varied to control blower rpm in response to changing dynamic pressure.

8 Claims, 4 Drawing Figures

ELECTRONIC CONTROL CIRCUIT FOR BLOWERS IN VEHICLES

This application is a continuation-in-part application of U.S. patent application Ser. No. 498,025, now abandoned filed Aug. 16, 1974, the disclosure of which is incorporated herein in its entirety by reference.

BACKGROUND OF THE INVENTION

This invention relates to an electronic control circuit for blowers in vehicles. The present invention is concerned particularly with a direct current analogue control circuit for a blower motor in a vehicle and which has particular utility in compensating for dynamic pressure effects.

Blowers are required for heating and cooling interiors of vehicles and also for air conditioning installations. It is important for the constant inside temperature that the blower air volume remains constant, regardless of speed of the vehicle and the like. In general, blowers with blades bent forward are used, since these blowers have a correspondingly steep characteristic curve and operate in the normal range with a relatively low rpm, i.e. they make little noise. It is disadvantageous that the amount of air supplied by the blower depends on the dynamic pressure which is in turn determined by the air inlet openings in the vehicle.

Control for D.C. blowers are known with compensating resistors which limit the voltage to the blower motor. In particular, air-cooled installations with fixed rotary or sliding resistors are known. Electronic fan rpm controls are also known, which make it possible to keep the voltage to the blower motor constant at a preset value and have electronic overload protection. The disadvantage is that with a constant voltage to the blower motor the rpm is kept constant, so that when the dynamic pressure increases, an increasing amount of air will be supplied, while the dynamic pressure exerts an additional rotational movement on the blower.

SUMMARY OF THE INVENTION

The purpose of the invention is to provide an electronic control circuit for blowers of the type described hereinabove, by means of which the influence of dynamic pressure can be eliminated, and further adjustment of blower rpm as a function of one or more temperatures can be assured. This task is accomplished according to the invention essentially by keeping the current consumption of the blower motor constant with respect to a variable set point by providing resistors to vary the set current at the regulator input in combination with a pressure sensor at the regulator input which ensures via the motor current a regulation of rotational moment as a function of dynamic pressure, by current consumption decreasing steadily as dynamic pressure increases. Advantageously, additionally temperature-dependent resistors can be installed at the regulator input. It is also possible to provide adjustable variable resistors at the regular input for adjustment of the set current. As dynamic pressure increases, the voltage to the fan motor decreases and the power drawn by the fan decreases correspondingly. At a given dynamic pressure, therefore, the increase in air volume is considerably less than in previously known types of control.

It is especially advantageous for vehicles with air-cooled engines for control of the rotational moment or current consumption to be controlled as a function of ambient temperature, inside temperature, hot-air-outlet temperature, or manually.

In vehicles with water-cooled engines, it is advantageous for a D.C. blower to be mounted on the radiator, independent of the engine, said blower being driven at a constant rotational moment i.e. constant current however, with additional temperature and/or pressure sensors being provided to adjust the set current.

According to a further improvement of the invention, control is accomplished in such a fashion that when the engine of the vehicle is started, the full starting rotational moment is available to the blower motor for a brief period of time. A fuse of the conventional form is not possible in the type of control according to the invention, since the highest rated current can never be exceeded. However, in order to provide adequate protection to the power circuit in the event of stalling, a further development of the invention provides for electronic protection. The protector works in such fashion that it responds when the critical low voltage, corresponding to the set current level, appears at the engine terminals, i.e. the voltage drop over the power transistor in series with themmotor grows too high. The circuit is designated such that it operates no later than when the blower motor stalls, but does not respond at the maximum possible dynamic pressure. When starting, the protector is disconnected by sensing means until the motor has started. Each time the vehicle engine is started, the protector is automatically set to the normal position. It is advantageous for this to have a voltage-dependent switch connected between the regulator input and the regulating resistor, for example, a diode, inversion amplifier, function generator, and the like.

BRIEF DESCRIPTION OF THE DRAWING

Further features and advantages of the invention will be described in greater detail with reference to the drawings.

DETAILED DESCRIPTION OF THE PREFERRED EMBODIMENTS

In the type of control circuit according to the invention, small D.C. voltages are applied to a regulator input and converted into proportional direct current for direct control of the torque of the D.C. blower motors. High-ohmage potentiometers may be installed at the regulator input for manual adjustment, hot-air-pipe sensors and/or dynamic pressure regulators (potentiometers with adjustment as a function of dynamic pressure). Every resistance value at the input of the regulator corresponds to a set current at the output.

Figure 1:
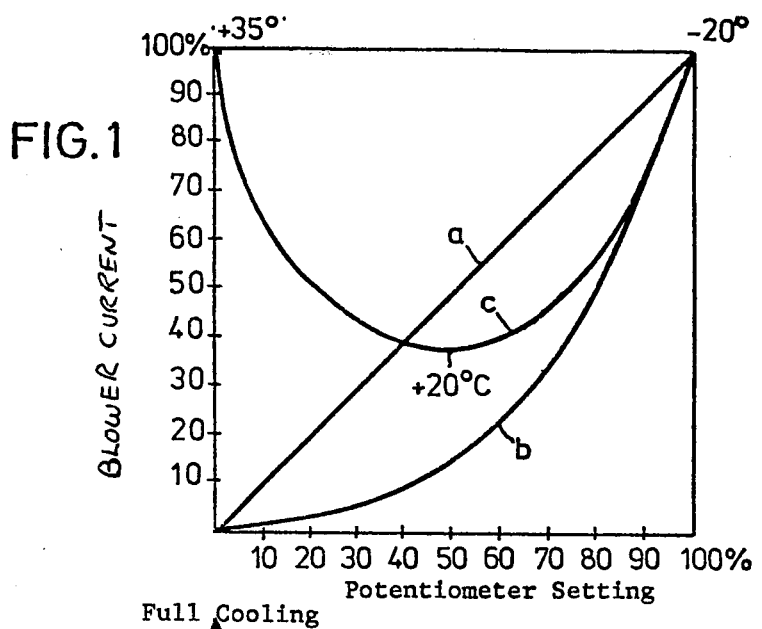
FIG. 1 shows various characteristic curves as a function of the current used by the blower, ambient temperature and rpm setting.

If a manually adjustable potentiometer is used, the current to the blower motor can be continuously adjusted manually. Under the increasing influence of dynamic pressure, blower rpm decreases because the rotational moment remains constant due to the constant current. Appropriate circuitry at the input can establish the characteristic curves shown in FIG. 1. The ordinate shows the current consumption of the blower in percent, while the abscissa shows the desired value setting obtained with the potentiometer. Curve (a) shows a linear characteristic curve, while curves (b) and (c) were plotted on the vehicle, with curve (b) representing a curve with increasing slope for a heater blower and curve (c) showing a decreasing slope for air-conditioning installations working in the air-conditioning mode and an increasing slope when used for heating.

Curve (c) has a minimum at an ambient temperature of approximately 20° C. Minimum blower air is required at these temperatures.

In regulators with dynamic pressure sensors, a definite relationship can be established between the dynamic pressure corresponding to the speed of the vehicle and the rotational moment. The dynamic pressure sensor adjusts the desired torque practically as a function of the dynamic pressure.

Figure 2:
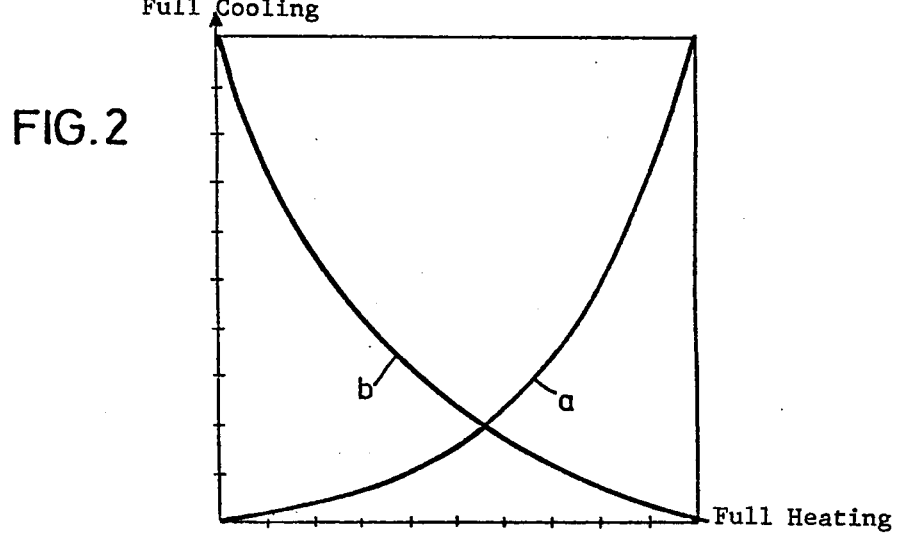
FIG. 2 shows characteristic curves for a temperature-dependent controlled fresh-air blower.

In FIG. 2, curve (a) shows the characteristic curve for a hot-air blower, and curve (b) shows a characteristic curve for a fresh-air blower.

Figure 3:
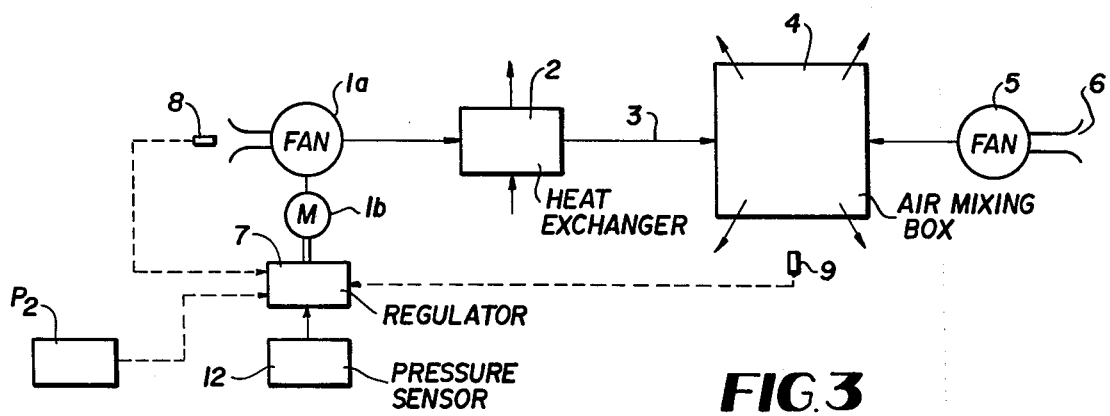
FIG. 3 shows the entire regulating circuit in schematic form.

The drawing in FIG. 3 shows a complete installation with automatic temperature control circuit. An ambient temperature sensor 8, which may be a NTC resistor or the like and an internal temperature sensor 9, which likewise may be a NTC resistor or the like, are located respectively at first and second inputs to a regulator 7. As shown diagrammatically, a minimum current setting potentiometer P2 is provided, which is to be discussed more fully below in conjunction with FIG. 4. The regulator 7 has its output connected to a motor 1b which drives a warm air fan 1a. Thus, the regulator 7 controls the torque of the motor 1b for the warm air fan 1a. In a heat exchanger 2 the fresh air is warmed by exhaust gases. The required air travels through an air duct 3 with variable material flow rate to an air mixing box 4 having an air-guidance adjustment. In addition, a fresh-air blower 5 with fresh-air intake 6 is provided. As the temperature increases, for example, inside—as sensed by the sensor 9, the resistance value increases. This means, that a higher current will be supplied to the blower motor 1b, so that torque and therefore the rpm will increase. A pressure sensor 12 is provided at the input to the regulator 7 so that the current i.e. the torque of the blower motor 1b originally kept constant is varied via the current set point under the influence of dynamic pressure.

Figure 4:
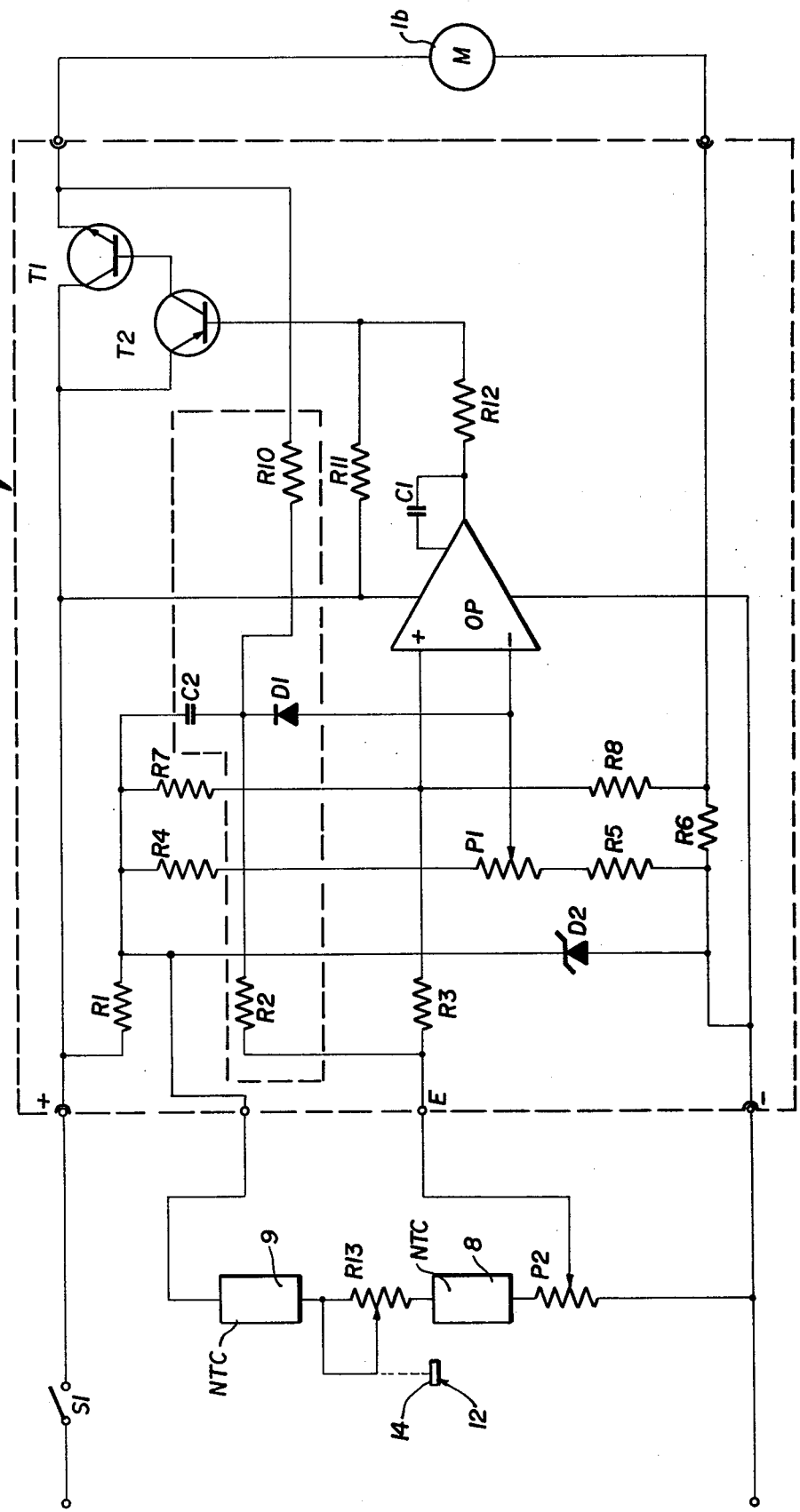
FIG. 4 is a schematic diagram of an exemplary control circuit according to the invention.

FIG. 4 shows a schematic diagram of the type of electronic control circuit according to the present invention. The circuit has an operational amplifier OP which is responsible for the behavior of the circuit, a control transistor T2 and a power transistor T1. A resistor R3 determines the range of adjustment of the current. A potentiometer P1 determines the maximum rated current with the external set potentiometer P2, also shown in FIG. 3, turned all the way. The set potentiometer P2 determines the minimum rated current. The blower motor 1b is placed in series with a constant current circuit so that an increase in the dynamic pressure will not effect that the blower rpm decreases. This motor 1b is preferably independently or permanently excited.

A capacitor C1 ensures sure starting of the blower and can be characterized as an electric regulator for starting. A resistor R1 function together with a Zener diode D2 to ensure that the maximum rated current is independent of the operating voltage.

The current to the motor 1b flows through resistor R6, with increasing current causing a greater voltage drop across the resistor R6. This voltage drop is transmitted via resistor R5 and the potentiometer P1, and resistor R8, to the respective inputs of the operational amplifier OP. The greater the difference at the inputs of the operational amplifier OP, the smaller the voltage at its output. According to this a current is affected by a resistor R12 and transmitted to the base of a transistor T2, amplified, and then passed on to the base of a transistor T1 where it is amplified once more. This circuit counteracts an increase in current. That is, when the current to the motor 1b initially increases, the voltage drop across the resistor R6 increases, causing the output of the operating amplifier OP to decrease. This increase in current causes the impedance of the transistor T1 to increase, which tends to reduce the current to the motor 1b, causing its current to be constant according to the set point. The preliminary setting of the desired current is accomplished by a control current through a resistor R3 which is produced by applying a voltage to an input E. The above-mentioned capacitor C1 ensures that the regulator provides full current when switched on.

A resistor R2 with a resistor R10, a diode D1 and a capacitor C2 form an electronic protector, in effect constituting an electronic fuse. The capacitor C2 prevents the electronic protector from responding immediately when the device is switched on, thus making the protector a time-delay type.

The resistor R1 and Zener diode D2 produce a constant voltage to power the transmitting resistors (adjustment resistors). This makes the feed of OP independent of variations in operating voltage. The limiting of the lower current is therefore dependent only on the setting of the resistors and potentiometer P2, and not on the line (i.e. battery) voltage.

The potentiometer P2 is connected in series with the series connectors of a first negative temperature characteristic (NTC) resistor constituting the sensor 8, a variable resistor R13, which forms the resistive portion of the pressure sensor 12 and a second negative temperature characteristic (NTC) resistor constituting the sensor 9. The resistor R13 is mechanically coupled to a pressure responsive member 14, which also forms part of sensor 12, and responds to dynamic pressure, thereby changing the resistance of the resistor 13 and thus the voltage supplied to the point E in dependence on pressure. As the pressure increases, the resistance of the resistor R13 decreases increasing the proportion of the voltage applied, via potentiometer P2 and resistor R13, to the plus input of the operational amplifier OP. As a result, less current is supplied to the blower motor 1b thereby reducing its torque as the pressure increases.

When the blower fan is blown upon by dynamic presser wind, the applied motor voltage decreases even with constant motor current. If the applied voltage drops below a critical voltage, the protector responds and shuts off the blower current. It is turned on again by interruption of the operating voltage or by a brief adjustment of the potentiometer P2 to its lowest point.

As shown in FIG. 4, an ignition switch S1 is provided in the positive line which supplies D.C. power to the regulator 7 so that the regulator 7 as well as circuitry associated therewith is energized when the engine of the vehicle is operating.

The invention can also be used to control fan motors for radiators in water-cooled engines.

Advantageously, the control can even be mounted in the blower inlet and be thus cooled directly.

The invention is not limited to the features and means described and presented. It also incorporates all technical modifications as well as all partial and sub-combinations.

It is to be understood that the foregoing description and accompanying drawings have been set out by way of illustration, not by way of limitation. Other embodiments and variants are possible with the spirit and scope of the invention, the scope being defined in the appended claims.

What is claimed is:

1. A direct-current electronic analogue control circuit for a fan blower motor in a vehicle, which blower motor is powered by a voltage source, having particular utility in compensating for dynamic pressure effects, the circuit comprising, in combination:

current control means electrically connected between said voltage source and the blower motor and responsive to an analogue control signal for keeping the current consumption of the blower motor substantially constant with respect to a set value regardless of the conditions of dynamic pressure at the fan input; and sensing means including at least one resistor electrically connected between said voltage source and said current control means for developing the control signal related to dynamic pressure at the fan input and adjusting the set current dependent upon the dynamic pressure conditions sensed at the fan input; whereby substantially constant air-conditioning conditions are maintained independently of traveling conditions.

2. A direct-current control circuit according to claim 1, especially for vehicles with air-cooled engines, including additional sensing means for sensing conditions of ambient temperature, inside temperature and hot-air-outlet temperature.

3. A direct-current control circuit according to claim 1, especially for vehicles with water-cooled engines, wherein a D.C. blower is mounted on the radiator and independent of the engine, said blower being driven at a constant rotational moment by constant current feed while lowering the set point with an increase in at least one of the dynamic pressure and temperature.

4. A direct-current control circuit according to claim 1, further including time delay means for making available to the blower motor full starting rotational moment briefly when starting the vehicle engine.

5. A direct-current control circuit according to claim 1, connected in series with an ignition switch which is in series with a power input line to said control circuit, and including interruption means for interrupting current to said blower motor when voltage across said blower motor drops below a critical level being a function of the set current, until the ignition current of the vehicle engine is briefly interrupted by said ignition switch or a set value resistance is broadly set to the lowest blower motor current.

6. A direct-current control circuit according to claim 1, further including a resistor and a Zener diode connected across said voltage source, said at least one resistor being coupled across said Zener diode.

7. A direct-current control circuit according to claim 1, including additional sensing means for sensing conditions of temperature, and wherein said additional sensing means are temperature-dependent resistors located at a regulator input for further adjusting the set current.

8. A direct-current control circuit according to claim 7, including at least one manually adjustable setting resistor.

* * * * *